US007716654B2

(12) United States Patent
Fleming et al.

(10) Patent No.: US 7,716,654 B2
(45) Date of Patent: May 11, 2010

(54) SIMULATION OF MULTI TOP-LEVEL GRAPHICAL CONTAINERS IN COMPUTING ENVIRONMENTS

(75) Inventors: Michael Fleming, Dublin (IE); Saito Chihiro, Mountain View, CA (US); Jonathan D. Courtney, Richardson, TX (US); Bartley H. Calder, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1154 days.

(21) Appl. No.: 10/871,097

(22) Filed: Jun. 18, 2004

(65) Prior Publication Data

US 2005/0283757 A1 Dec. 22, 2005

(51) Int. Cl.
*G06F 9/45* (2006.01)
*G06F 3/00* (2006.01)
*G06F 3/048* (2006.01)
*G06F 9/455* (2006.01)

(52) U.S. Cl. .............. 717/138; 717/147; 717/148; 703/26; 703/27; 703/28; 715/762; 715/763; 715/764

(58) Field of Classification Search ............. 717/135, 717/105, 121, 138, 151, 106–107; 703/26–28; 715/762–764

See application file for complete search history.

(56) References Cited

U.S. PATENT DOCUMENTS

| 5,287,447 | A * | 2/1994 | Miller et al. ............. 715/804 |
| 6,356,284 | B1 * | 3/2002 | Manduley et al. .......... 715/779 |
| 6,925,597 | B2 * | 8/2005 | Anwar ....................... 717/137 |
| 2001/0020291 | A1 | 9/2001 | Kudukoli et al. |
| 2001/0043235 | A1 * | 11/2001 | Best et al. .................. 345/781 |
| 2002/0085020 | A1 * | 7/2002 | Carroll, Jr. ................. 717/100 |
| 2002/0180790 | A1 * | 12/2002 | Broussard .................. 345/762 |

(Continued)

FOREIGN PATENT DOCUMENTS

EP 1098246 A1 5/2001

OTHER PUBLICATIONS

JFrame Class Definition, available at http://java.sun.com/j2se/1.4.2/docs/api/javax/swing/JFrame.html.*

(Continued)

*Primary Examiner*—Wei Y Zhen
*Assistant Examiner*—Ryan D. Coyer
(74) *Attorney, Agent, or Firm*—Marsh Fischmann & Breyfogle LLP; Kent A. Lembke; R. Mahboubian (57) ABSTRACT

Techniques for simulation of multi top-level graphical-containers (e.g., frames) in an object-oriented computing environment are disclosed. A Multi Top-level Graphical-Container Simulator (MTGS) can be provided to simulate multi top-level graphical container support for applications that expect to use a plurality of top-level graphical containers (e.g., frames, windows). A MTGS may be implemented as a layer between a GUI-based application and an operating system and/or hardware/device with limited or virtually no graphical support capability. The Multi Top-level Graphical Simulator (MTGS) can effectively isolate the operating systems and/or hardware/device from the GUI-based application, and yet hide this simulation from the operating system and/or hardware/device. MTGS may be implemented in a platform independent programming language (e.g., Java™ programming language using a set of Java™ classes which have been provided in the Java™ Swing development toolkit.

27 Claims, 5 Drawing Sheets

U.S. PATENT DOCUMENTS

2004/0021688 A1* 2/2004 Phillips .................. 345/762

OTHER PUBLICATIONS

JInternalFrame Class Definition, available at http://java.sun.com/j2se/1.4.2/docs/api/javax/swing/JInternalFrame.html.*
JDesktopPane Class Definition, available at http://java.sun.com/j2se/1.4.2/docs/api/javax/swing/JDesktopPane.html.*
Chimera, R. 1995. Platform Independent GUI Builders Advance Software Engineering to Handle HCI Issues. In Proceedings of the Workshop on Software Engineering and Human-Computer interaction (May 16-17, 1994). R. N. Taylor and J. Coutaz, Eds. Lecture Notes in Computer Science, vol. 896. Springer-Verlag, London, 28-34.*
EPO Search Report mailed Jul. 29, 2005, 3 pages.
Andrei Cioroianu, "Java Desktop Development" Feb. 18, 2004, pp. 1-10, O'Reilly on Java.com.
Magelang Institue, "Tutorials $ Code Camps Short Course," pp. 1-46, developers.sun.com.

* cited by examiner

SIMULATION OF MULTI TOP-LEVEL GRAPHICAL CONTAINERS IN COMPUTING ENVIRONMENTS

BACKGROUND OF THE INVENTION

The present invention relates generally to computing systems, and more particularly, to techniques for simulation of Multi top-level graphical containers in a computing environment.

A Graphical User Interface (GUI) is often referred to as a graphical (rather than purely textual) user interface to a computer. Typically, a Web browser used for browsing the Internet provides a GUI. The term GUI may have come into existence because the first interactive user to interface with computers were not really graphical. Instead, text-and-keyboard oriented interfaces were first used which usually consisted of a set of commands and computer responses. The command interface of a DOS operating system (which is still available on some Windows operating systems) is an example of a user-computer interface before GUI was developed. An intermediate step in user interfaces between the command line interface and the GUI may be a non-graphical menu-based interface, which allows a mouse to be used rather than just commands entered by a keyboard.

Today's many operating systems provide a fairly advanced graphical user interface. In addition, applications can use various elements of a GUI that come with the operating system and/or add their own graphical user interface elements and ideas. A GUI sometimes uses one or more metaphors for objects familiar in real life, such as the desktop, the view through a window, or the physical layout in a building. Elements of a GUI may include, for example: windows, frames, pull-down menus, buttons, scroll bars, iconic images, wizards, the mouse, pointer, and curser. With the increasing use of multimedia as part of the GUI, sound, voice, motion video, and virtual reality interfaces are likely to become part of the GUI for many applications. A system's graphical user interface along with its input devices is sometimes referred to as its "look-and-feel."

When creating an application in an object-oriented programming environment, many object-oriented tools exist that facilitate writing a graphical user interface. These tools (e.g., a graphical development toolkit) may, for example, include a set of GUI elements that are defined as a class widget from which object instances can be created for an application. An application programmer may develop code by using or modifying prepackaged methods that an object will use to respond to user stimuli.

In general, a widget can be an element of a graphical user interface (GUI) that displays information or provides a specific way for a user to interact with the operating system and application. Widgets include icons, pull-down menus, buttons, selection boxes, progress indicators, on-off checkmarks, scroll bars, windows, window edges (that let you resize the window), toggle buttons, forms, and many other devices for displaying information and for inviting, accepting, and responding to user actions.

A widget may also refer to a small program that is written in order to describe what a particular widget looks like, how it behaves, and how it interacts in response to user actions. Most operating systems include a set of ready-to-tailor widgets that a programmer can incorporate in an application, specifying how it is to behave. In object-oriented programming, each type of widget can be defined as a class (or a subclass under a broad generic widget class) and can be associated with a particular window. By way of example, in the AIX Enhanced X-Window Toolkit, a widget is the fundamental data type.

Most of the application development programming languages today, such as Java™ programming language and Tool Command Language, come with a ready-made library of widgets that a programmer can incorporate and modify. By way of example, Java™ development environment provides an Abstract Window Toolkit (AWT) which can be used, among other things, to develop web-based applications (or applet). Another GUI-based development tool (or toolkit) provided in the Java™ development environment is "Swing." "Swing" provides a relatively robust framework for developing GUI-based applications that are platform independent (i.e., can be executed over a variety of different operating systems and/or hardware platforms). Swing provides components that do not rely on platform-specific (native) widgets typically used by a particular operating system (e.g., windows operating system). Rather, Swing components can be painted using graphic primitives (e.g., lines, rectangles, text). The painting can be delegated to a look and feel (L&F) plug-in that can imitate the native (L&F).

With the popularity of GUI-based applications (e.g., web browser, mail messengers), more and more graphical support has been provided in the operating systems. As a result, graphical support in the operating systems (e.g., windowing manager) have become more advanced and capable of handling relatively sophisticated tasks (e.g., allowing an application to generate and use multiple top-level containers). Although providing this level of graphical capabilities is feasible and desirable for some computing environments (e.g., a desk top), it may not be feasible or desirable for relatively advanced graphical support capabilities in many other computing environments (e.g., mobile phones, embedded devices, Personal Digital Assistants, etc.). However, it would be useful to allow the GUI-based applications that have been developed for environments with relatively advanced graphical support capability to also run on computing environments or devices that provide a limited or virtually no graphical support capability. This would also enable an application developer to develop a GUI-based application for various computing environments regardless of the level of graphical support that may be provided in them.

In view of the foregoing, alternative techniques for executing GUI-based application are needed. These techniques should allow a GUI-based application which expects an advanced graphical support capability to also be executed on an environment that provides a limited or virtually no graphical support capability.

SUMMARY OF THE INVENTION

Broadly speaking, the invention relates to techniques for simulation of multi top-level graphical-containers (e.g., frames) in a computing environment.

In accordance with one aspect of the invention, a Multi Top-level Graphical-Container Simulator (MTGS) can be provided to, among other things, simulate multi top-level graphical container support for applications that expect to use a plurality of top-level graphical containers (e.g., frames). As will be illustrated, the Multi Top-level Graphical Simulator (MTGS) may be implemented as a layer between a GUI-based application and an operating system and/or hardware/device with limited or virtually no graphical support capability. The Multi Top-level Graphical Simulator (MTGS) can effectively isolate the operating systems and/or hardware/device from the GUI-based application. Moreover, the Top-level Graphical Simulator (MTGS) can present a simulated Multi Top-level Graphical environment to the application program, and yet hide this simulation from the operating system and/or hardware/device. As a result, application programs that expect a fairly advanced graphical support may be executed on operating systems or hardware/device that do not provide an advanced graphical support without causing a hardware or software error.

As will also be illustrated, Top-level Graphical Simulator (MTGS) may be implemented in a platform independent programming language (e.g., Java™ programming language). This allows implementation of MTGS across many different hardware and/or operating systems. As will be appreciated by those skilled in that art, a set of Java™ classes which has been provided in the Java™ Swing development toolkit ("javax.swing") may be used to implement the MTGS in accordance with one embodiment of the invention. The classes that may be used include class "JInternalFrame," "JFrame," and "JDesktopPane" which have been provided in Appendix A as a convenient reference which is attached herein.

The invention can be implemented in numerous ways, including as a method, a computer system and a computer readable medium. These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, alternative techniques for executing GUI-based applications would be useful. These techniques should allow a GUI-based application which expects an advanced graphical support capability to also be executed on an environment that provides limited or virtually no graphical support capability. The present invention realizes that one such advanced graphical support capability that would be needed is support for multiple top-level graphical-containers. In general, a top-level graphical-container can be a top-level container for graphical (or GUI-based) components of an object oriented computing environment. By way of example, a top-level graphical-container can represent the first level of a graphical container (e.g., top-level frame, top-level, window, root pane) in a hierarchical arrangement used in many operating systems.

In accordance with one aspect of the invention, a Multi Top-level Graphical-container Simulator (MTGS) can be provided to, among other things, simulate Multi top-level graphical-container support for applications that expect to use a plurality of top-level graphical-containers (e.g., frames, windows). As will be illustrated, the Multi Top-level Graphical-container Simulator (MTGS) may be implemented as a layer between a GUI-based application and an operating system and/or hardware/device with limited or virtually no graphical support capability. The Multi Top-level Graphical-container Simulator (MTGS) can effectively isolate the operating system and/or hardware/device from the GUI-based application. Moreover, the Top-level Graphical-container Simulator (MTGS) can present a simulated Multi Top-level Graphical-container environment to the application program, and yet hide this simulation from the operating systems and/or hardware/device. As a result, application programs that expect a fairly advanced graphical support may be executed on operating systems or hardware/device that do not provide an advanced graphical support without causing a hardware or software error.

As will also be illustrated, Top-level Graphical-container Simulator (MTGS) may be implemented in a platform independent programming language (e.g., Java™ programming language). This allows implementation of MTGS across many different hardware and/or operating systems. As will be appreciated by those skilled in that art, a set of Java™ classes which have been provided in the Java™ Swing development toolkit ("javax.swing") may be used to implement the MTGS in accordance with one embodiment of the invention. The classes that may be used include class "JInternalFrame," "JFrame," and "JDesktopPane" which have been provided in Appendix A.

Embodiments of the invention are discussed below with reference to FIGS. 1A-5. However, those skilled in the art will readily appreciate that the detailed description given herein with respect to these figures is for explanatory purposes only as the invention extends beyond these limited embodiments.

Figure 1A:
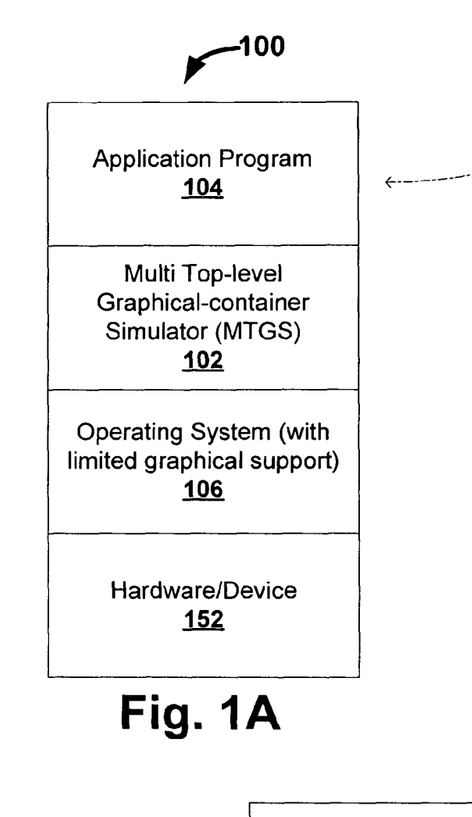
FIG. 1A-C depict a multi top-level graphical simulator (MTGS) in a computing environment in accordance with one embodiment of the invention.

FIG. 1A depicts a computing environment 100 in accordance with one embodiment of the invention. As shown in FIG. 1A, a Multi top-level Graphical-container Simulator (MTGS) 102 is provided in the computing environment 100. From an architectural perspective, the MTGS 102 can be provided as a layer between an application program 104 and an operating system 106. As will be appreciated, the operating system 106 may provide only limited graphical support. In other words, the operating system 106 does not need to provide advanced graphical support and/or an advanced graphical support component (e.g., window manager provided for Windows operating). As such, the operating system 106 does not need to support multiple top-level graphical containers (e.g., top-level frames).

On the other hand, the application program 102 may be an application program that expects and/or utilizes multiple top-level graphical-containers (e.g., frames). Nevertheless, the MTGS 102 can allow the application program 102 to execute even though multiple top-level containers may not be provided by the operating system 106. The MTGS 102 effectively simulates a multiple top-level graphical container environment for the application program 102. This means that the application program 102 can behave as if the operating system 106 provides multiple top-level graphical container support.

Figure 1B:
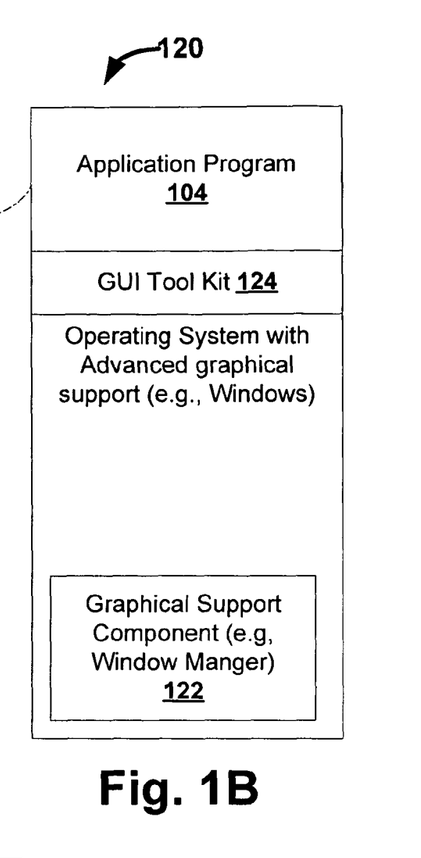

As a result of the simulation provided by the MTGS, an application program that is implemented for a multiple top-level graphical container environment can be executed on computing environments that do not provide support for multiple top-level graphical containers. To further illustrate, FIG. 1B depicts the same application program 102 running in a computing environment 120 which provides advanced graphical support 122 (e.g., a window manager) in the operating system. It should also be noted that the application program 102 may be implemented in a platform independent programming language (Java™ programming language). In addition, the application program 102 may be developed using a graphical user interface (GUI) tool kit 124 (e.g., swing graphical development toolkit available from Sun™ Microsystems). In any case, MTGS 102 allows the application program 102, which may make several requests for top-level graphical containers, to be executed on a computing environment with limited or virtually no graphical support.

Figure 1C:
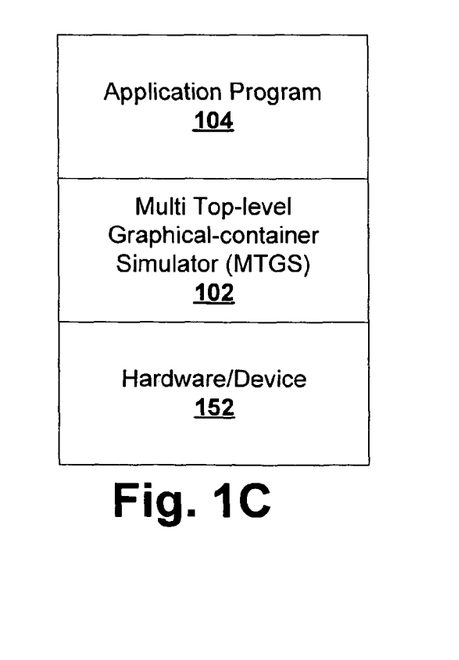

As shown in FIG. 1C, the MTGS 102 may be implemented essentially directly over the hardware or a device 152 and yet support the application program 102. In such cases, the MTGS 102 may provide relatively more graphical support functionality which is conventionally provided in the operating system environment (e.g., windowing manager in window's environment). In addition, it will be appreciated that MTGS 102 may be implemented in a platform independent language (e.g., Java™ programming language). Furthermore, the MTGS 102 may be implemented using components that are available in Java™ GUI toolkit development environment. The MTGS 102 may, for example, utilize some classes that are provided in the "Swing" GUI tool kit. Thus, MTGS 102 may be implemented very cost effectively and/or without departing from widely used conventions. An exemplary embodiment which can be implemented using the "Swing" GUI tool kit will be further discussed below.

It should also be noted that MTGS 102 can hide the simulation of multi top-level graphical-container environment from the operating system 106 and/or hardware device 152. This means that the execution of the application program 102 does not result in a hardware or software failure. As will be appreciated, the MTGS 102 can effectively generate virtual top-level containers that are presented to the application program 102 in accordance with one embodiment of the invention. These virtual top-level containers are implemented internally (i.e., inside the MTGS itself). However, these internal containers may be completely invisible to the application program 102 and/or an operating system 106.

Figure 2:
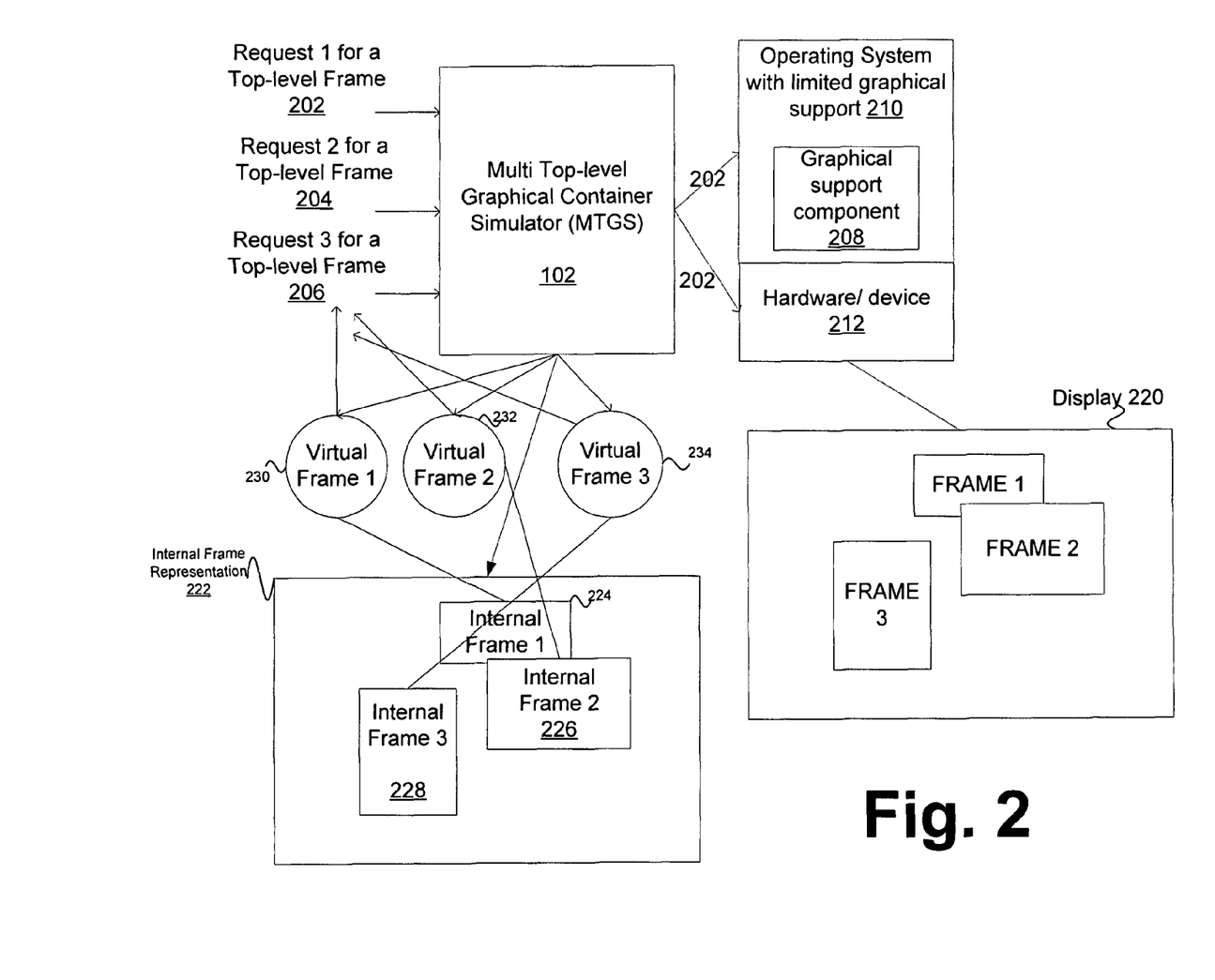
FIG. 2 illustrates a multi top-level graphical simulator (MTGS) in accordance with one embodiment of the invention.

FIG. 2 illustrates a multi top-level graphical-container simulator (MTGS) 102 in accordance with one embodiment of the invention. As shown in FIG. 2, the MTGS 102 can receive a plurality of requests 202, 204 and 206 for generating a top-level "frame". In this embodiment, a top-level graphical container is referred to as a frame which is a term used in some programming environments (e.g., Java™ programming environment). However, in general, a request for a top-level container, window, a dialog, or any other top-level graphical container may be received and processed in accordance with the principles illustrated below. It should also be noted that the requests 202, 204 and 206 may, for example, be made by an application program (e.g., application program 102 of FIG. 1).

In any case, when a request 202 for a top-level frame is received, the MTGS 102 determines whether this is a first request for a top-level frame. If MTGS 102 determines that this is the first request for a top-level frame, the MTGS may forward the first request 202 to an operating system component 208 within an operating system 210 which may generate a top-level graphical container (i.e., a native top-level frame, for example, a top-level window). It should be noted, however, if no operating system 210 is provided, the MTGS 102 may essentially write to the hardware device 212 (e.g., write to a frame buffer to effectively implement a top-level graphical container or frame. In either case, the first request 202 for a top-level frame can be processed as a request for a top-level frame normally would. However, the MTGS 102 will also initiate an internal frame representation 222 which includes an internal frame representation 224 for frame 1. A graphical representation of frame 1 can also be displayed (or painted) in a display 220 for a user.

As will be appreciated by those skilled in the art, any subsequent requests for top-level frames (204 and 206), however, may be entirely represented as internal frames in the internal representation 222. More particularly, when a request 204 for a second top-level frame is received, the MTGS 102 does not forward the request to the graphical component 208 of the operating system 210 or directly write to the hardware device 212. Instead, the MTGS 102 generates an internal frame 224 in the internal frame representation 220. By way of example, a request for a top-level frame (e.g., a call to a JFrame constructor) which is normally mapped to a native (or heavyweight) component may be effectively proxied to a lightweight component (e.g., JInternalFrame constructor) that provides many of the features of a native (or heavyweight) component. These features, for example, include dragging, closing, becoming an icon, resizing, title display, and support for menu bars. As a result, all top-level frame instances may be embedded in a single top-level graphical container (or window), but behave in other aspects as a top-level frame (or window). This transformation will be further discussed below, but it should be noted that the MTGS 102 does not forward requests for second (204) and third (206) frames to the operating system. Rather, these requests are handled internally and in the process of doing so, the MTGS 102 generates and maintains an internal frame representation 222. The MTGS 102 also sends back "acknowledgments" to all the requests 202, 204 and 206 that indicates a top-level frame was generated. By way of example, may be in the form of instantiated virtual frame objects 230, 232 and 234 which can be returned. The virtual frame objects 230, 232 and 234 may also be used, for example, by an application program to delegate work to the internal frames 224, 226 and 228. As a result, frames 1, 2 and 3 may be displayed and updated in the display 220 even though the operating system 210 may limit top-level containers (e.g., windows) to one at a given time. From a user's perspective, the simulation performed by the MTGS 102 can be completely transparent. In addition, the MTGS 102 isolates the operating system and/or hardware from second and third requests 204 and 206 for top-level frames. As a result, an application which requests multiple top-level frames can be made to believe that a top-level frame has been generated partly because of the acknowledgments that are sent by the MTGS 102, and no operating system and/or hardware error is generated partly because the second and third requests 204 and 206 which are deemed as inappropriate by the operating system 210 and/or hardware/device 212 are not forwarded by the MTGS 102. As will be appreciated by those skilled in the art, the MTGS 102 can also provide mapping and other functionalities that are needed to support the simulation of a multi top-level frame environment in an internal frame representation 222. These functions, for example, include setting up listeners to marshal events to an application, as well as other frame management functions that are conventionally provided by an operating system.

Figure 3:
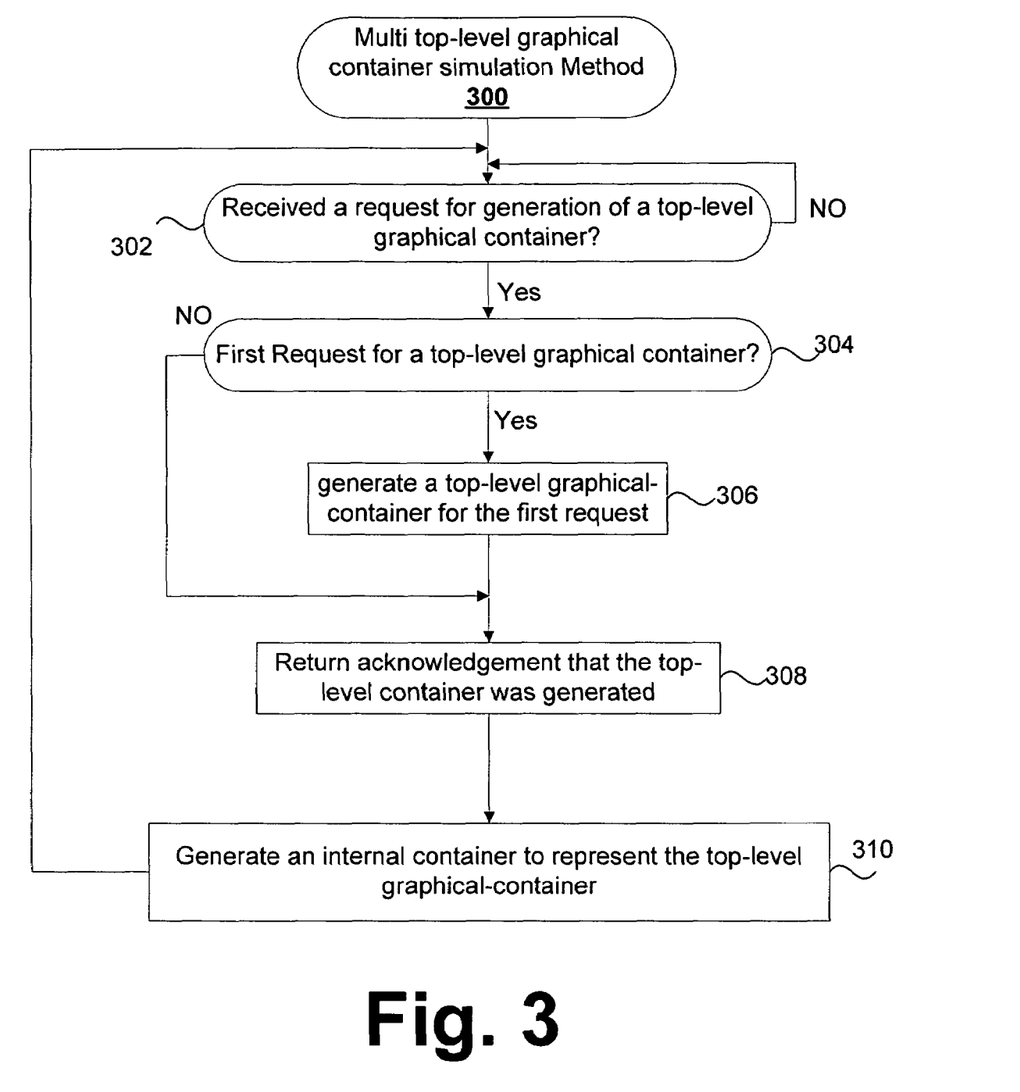
FIG. 3 depicts a multi top-level graphical-container simulation method for simulating a multi top-level graphical environment is depicted in accordance with one embodiment of the invention.

Referring now to FIG. 3, a multi top-level graphical-container simulation method 300 for simulating a multi top-level graphical environment is depicted in accordance with one embodiment of the invention. The multi top-level graphical-container simulation method 300 can, for example, be used by the Multi Top-level Graphical-container Simulator (MTGS) 102 of FIG. 2. Initially, it is determined (302) whether a request for generation of a top-level graphical container is received. If it is determined (302) that a request for generation of a top-level graphical container is received, it is determined (304) whether this is the first request for generation of a top-level graphical-container. If it is determined (304) that this is a first request for a top-level container, the simulation method 300 generates (306) a top-level graphical container. The generation (306) may, for example, generate a native top-level window through an operating system or write to a frame buffer to generate a top-level graphical container (e.g., window) on a display. Following generation (306) of the top-level graphical container, an acknowledgement is returned (308) that the top-level graphical container was generated. In addition, an internal container is generated (310) which can represent a top-level graphical container. The responsibilities of a top-level graphical container may be delegated to the internal container. Thereafter, it is determined (302) whether a request for generation of a top-level graphical container is received.

However, if it is determined (304) that the request received (302) is not a first request for a top-level graphical container, after an acknowledgment is returned (308), an internal container is generated (310) which can represent a top-level graphical container. In other words, another top-level container is not generated when it is determined (304) that the request for the top-level graphical-container is not the first request (i.e., another top-level graphical container has already been generated (306)). However, it should be noted that an acknowledgement is still returned (308). This acknowledgment indicates to the component that made the request for a top-level graphical component that a top-level graphical container was generated even though only an internal representation of the top-level graphical has been made. It should also be noted that in such cases no request for generation of a top-level container is forwarded, unlike the generation (306) which may forward a request for generation of a top-level graphical container to a graphical support component (e.g., a windowing manager) in the operating system.

Figure 4:
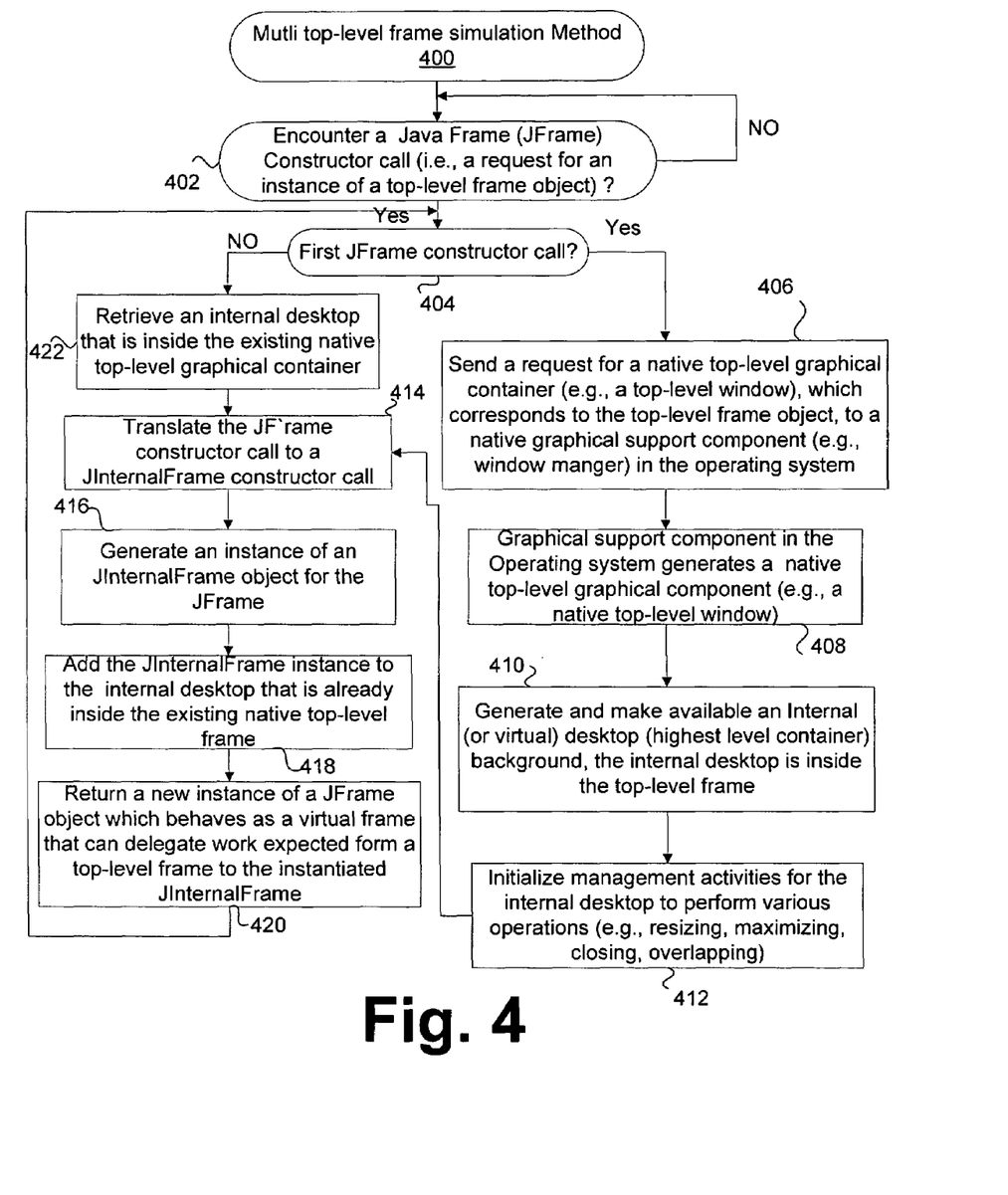
FIG. 4 depicts a multi top-level frame simulation method for simulating a multi top-level frame environment in accordance with one embodiment of the invention.

FIG. 4 depicts a multi top-level frame simulation method 400 for simulating a multi top-level frame environment in accordance with one embodiment of the invention. Multi top-level frame simulation can be performed in a computing environment that may not provide such graphical capability in the operating system. As will be appreciated, the multi top-level frame simulation method 400 illustrates how an application program that is written in Java™ Programming Language using a Swing graphical development tool kit may be executed in a computing environment that does not provide multi top-level frames support (i.e., only one top-level frame can be generated) in the operating system. Initially, it is determined (402) whether a Java™ Frame (JFrame) constructor call has been encountered. The JFrame constructor call represents a request, for example, from an application program, for an instance of a JFrame object. The JFrame object represents abstraction (a JFrame) which may be mapped to a native top-level graphical container (e.g., a top-level window in the Window operating system).

Next, it is determined (404) whether the encountered (402) JFrame constructor call is the first JFrame constructor call which has been encountered (e.g., received from an application program). If it is determined (404) that this is the first JFrame constructor call encountered (402), a request for a native top-level graphical container (e.g., a top-level window in Windows environment) is sent (406). This request may, for example, be sent to a native graphical component (e.g., window manager) in the operating system. As such, a graphical support component in the operating system may generate (408) the top-level graphical container (e.g., a top-level window in Windows operating system, a frame buffer on hardware/device). Next, an internal (or virtual) "desktop" (i.e., highest level graphical container) background is generated and made available. The internal (or virtual) desktop may be generated inside the native top-level graphical container. As will be appreciated, a constructor "JDesktopPane" may be used to generate the internal (or virtual) desktop effectively in the native top-level graphical container (e.g., a top-level window, a frame buffer on hardware/device). Thereafter, the internal desktop is initialized for management activities so that, among other things, various operations may be performed (e.g., resizing, maximizing, closing, overlapping of graphical containers). After initializing (412) of the internal desktop management activities, the JFrame constructor call is translated to a "JInternalFrame" constructor call. As such, an instance of a JInternalFrame object is generated. As noted above, "JInternalFrame" represents a lightweight component that provides many of the features of a native (or heavyweight) component. These features, for example, include dragging, closing, becoming an icon, resizing, title display, and support for menu bars. It should be noted that the instance of JInternalFrame object is generated (416) in response to a JFrame constructor call which has been encountered (402). The "JInternalFrame" can be delegated the work which may be expected of a native (or heavyweight) component. As a result, all top-level frame instances may be embedded in a single top-level graphical container (or window), but behave in other aspects as a top-level frame (or window).

Following the generation (416) of JInternalFrame instance, the "JInternalFrame" instance is added (418) to the internal desktop that was generated (410) inside the top-level native graphical container. However, it should be noted that a new instance of a JFrame object is returned (420). This new instance of the JFrame object behaves as a virtual frame which can delegate work which is expected of a top-level frame to the instantiated (416) JInternalFrame.

It should also be noted that if it is determined (404) that the encountered (402) request is not a first encountered JFrame constructor call (e.g., a second request), instead of sending (406) a request for a native top-level graphical container, the internal desktop that is inside the existing native top-level graphical container is retrieved (422). Thereafter, the JFrame constructor call is translated (414), an instance of JInternalFrame object is generated (416) and added (418) to the internal desktop. Again, it should be noted that a new instance of a JFrame object is returned 420 which can behave as a virtual frame. This virtual frame can delegate work to the instantiated (416) JInternalFrame.

Figure 5:
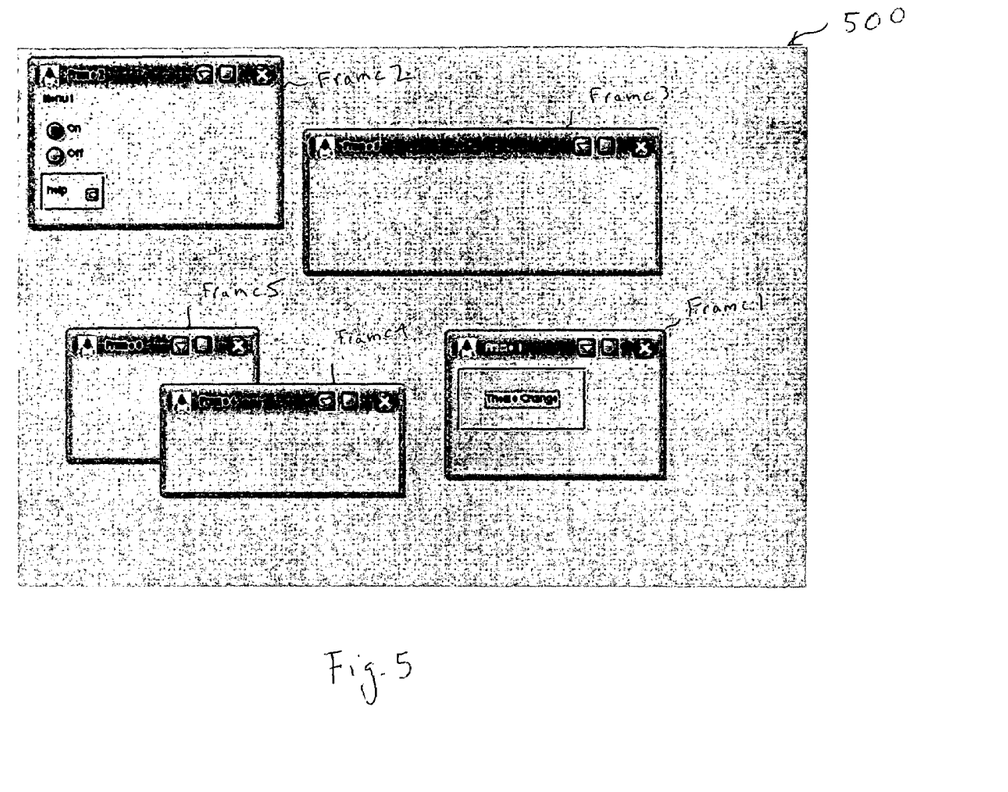
FIG. 5 depicts a display in accordance with one embodiment of the invention.

To further illustrate, FIG. 5 depicts a display 500 in accordance with one embodiment of the invention. It should be noted that various frames (frame 1, frame 2, frame 3, frame 4, and frame 5) represent frames that have been implemented as internal frames, yet these frames were produced by an application program that generated them as top-level frames. It should be appreciated that the generation of the internal frames can be completely transparent to the user and the user may essentially perform the same set of operations that would be performed on top-level frames produced using advanced graphical capability of an operating system.

As will also be appreciated, the invention allows implementation of GUI-based applications on both specifications that allow multiple top-level frames (e.g., Personal Profile Specification available from Sun Microsystems) as well as those that limit generation of top-level frames to only one (1) top-level frame at any given time.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed:

1. A computer-implemented data processing system including a processor and memory which executes an application program running in the memory that uses a plurality of top-level graphical-containers, said computer-implemented data processing system performing a method comprising the steps of:
    receiving a request from said application program for a top-level graphical-container, wherein said application program is implemented in the Java programming language using the Swing GUI development tool-kit;
    determining whether a native top-level graphical-container has already been generated;
    if it is determined that a native top-level graphical-container has not already been generated, sending the request directly to the graphical component of an operating system or writing the top-level graphical-container directly to a hardware component;
    if it is determined that a native top-level graphical-container has already been generated, generating an instance of an internal virtual frame object that simulates a native top-level graphical-container; and
    returning an acknowledgment indicating that a top-level graphical-container exists to said requesting application program.

2. A computer-implemented data processing system as recited in claim 1, wherein said application program is implemented in a platform-independent programming language.

3. A computer-implemented data processing system as recited in claim 2, wherein said application program is implemented in using a Java GUI development tool-kit.

4. A computer-implemented data processing system as recited in claim 2, wherein said Java GUI development tool-kit is a Swing toolkit.

5. A computer-implemented data processing system as recited in claim 1,
    wherein said application program is implemented in a platform-independent programming language; and
    said computer-implemented data processing system performs the method further comprising the steps of:
        determining whether a native top-level container has been generated;
        generating an instance of an internal frame object that represents a native top-level container when said determining determines that said native top-level container has already been generated.

6. A computer-implemented data processing system as recited in claim 5, wherein said computer-implemented data processing system performs the method further comprising the step of:
    generating a JInternalFrame object that represents a native top-level container.

7. A computer-implemented data processing system as recited in claim 6, wherein said computer-implemented data processing system performing the method further comprising the steps of:
    generating an instance of a virtual frame object that can delegate to said instance of said internal frame object.

8. A computer-implemented data processing system as recited in claim 7, wherein said computer-implemented data processing system performs the method further comprising the steps of:
    generating an instance of a JFrame object that can delegate to said JInternalFrame object; and
    returning said instance of said JFrame to said application program.

9. A computer-implemented data processing system as recited in claim 8, wherein said computer-implemented data processing system performs the method further comprising the steps of:
    generating an internal desktop that can be virtually represented inside said generated native top-level frame.

10. A computer-implemented data processing system performing the method as recited in claim 9, wherein said generating an internal desktop comprises instantiating a JDesktopPane object.

11. A computer-implemented data processing system performing the method as recited in claim 9, wherein said method further comprises:
    initializing said internal desktop for one or more graphical container management activities.

12. A computer-implemented multi top-level graphical-container apparatus including a memory and a processor for a processing environment that limits generation of top-level graphical-containers to only one top-level graphical container at a given time, wherein said multi top-level graphical-container apparatus:
    receives a request from an application program for a top-level graphical-container, wherein said application program is implemented in the Java programming language using the Swing GUI development tool-kit;
    determines whether a native top-level graphical-container has already been generated;
    sends the request directly to the graphical component of an operating system or writes the top-level graphical-container directly to a hardware unit if the apparatus determines that the native top-level graphical-container has not already been generated;
    generates an instance of an internal virtual frame object that simulates a native top-level graphical-container if the apparatus determines that a native top-level graphical-container has already been generated; and
    returns an acknowledgment indicating that a top-level graphical-container exists to the requesting program.

13. A multi top-level graphical-container apparatus as recited in claim 12, wherein said request is send by an application program.

14. A multi top-level graphical-container apparatus as recited in claim 13, wherein said application program is implemented in a platform-independent programming language.

15. A multi top-level graphical-container apparatus as recited in claim 13, wherein said application program is implemented in using a Java GUI development tool-kit.

16. A multi top-level graphical-container apparatus as recited in claim 15, wherein said Java GUI development tool-kit is a Swing toolkit.

17. A multi top-level graphical-container apparatus as recited in claim 12, wherein said multi top-level graphical-container is implemented as a software module written in the Java programming language, and said software module isolates a GUI-based Java application program from a native platform.

18. A multi top-level graphical-container apparatus as recited in claim 13,
wherein multi top-level graphical-container apparatus is further capable of:
determining whether a native top-level container has been generated;
generating an instance of an internal frame object that represents a native top-level container when said determining determines that said native top-level container has already been generated.

19. A multi top-level graphical-container apparatus as recited in claim 18,
wherein multi top-level graphical-container apparatus is further capable of:
generate an instance of a JInternalFrame object:
generating an instance of a JFrame object that can delegate to said JInternalFrame object; and
returning said instance of said JFrame to said application program.

20. A computer readable storage medium including computer program code for executing an application program that use a plurality of top-level graphical-containers, said computer readable storage medium comprising:
computer program code for receiving a request from said application program for a top-level graphical-container, wherein said application program is implemented in the Java programming language using the Swing GUI development tool-kit;
computer program code for determining whether a native top-level graphical-container has already been generated;
computer program code for sending the request directly to the graphical component of an operating system or writing the top-level graphical-container directly to a hardware unit if the code determines that the native top-level graphical-container has not already been generated;
computer program code for generating an instance of an internal virtual frame object that simulates a native top-level container if the code determines that a native top-level graphical-container has already been generated; and
computer program code for returning an acknowledgment indicating that a top-level graphical-container exists to said requesting application program.

21. A computer readable storage medium as recited in claim 20, wherein said application program is implemented in a platform-independent programming language.

22. A computer readable storage medium as recited in claim 20, wherein said application program is implemented in using a Java GUI development tool-kit.

23. A computer readable storage medium as recited in claim 22, wherein said computer readable medium further comprises:
computer program code for generating an instance of a JInternalFrame object; and
computer program code for generating an instance of a JFrame object that can delegate to said JInternalFrame object; and
computer program code for returning said instance of said JFrame to said application program.

24. A computer readable storage medium as recited in claim 23, wherein said computer readable medium further comprises:
computer program code for sending an acknowledgment to said application program, wherein said acknowledgment indicates to said application program that a top-level graphical-container has been generated even though only an internal frame has been generated, thereby allowing simulation of said multi top-level graphical-container to be hidden form said application program.

25. A computer-implemented data processing system as recited in claim 1, wherein said computer-implemented data processing system performs the method comprising:
sending a request for creation of a top-level graphical-container to an operating system when said determining determines that a top-level graphical-container has not been generated; and
not sending a request for creation of a top-level graphical-container to an operating system when said determining determines that a top-level graphical-container has already been generated.

26. A computer-implemented data processing system performing the method as recited in claim 25, wherein said operating system is a Windows operating system and said request is forwarded to a windowing manager in said Windows operating system.

27. A computer-implemented data processing system performing the method as recited in claim 1, wherein said method further comprises:
writing directly to a frame buffer on a hardware component or a device to generate said top-level graphical-container.

* * * * *